April 17, 1928.  O. A. KRENKE  1,666,259
SHOCK ABSORBER
Filed Feb. 7, 1927
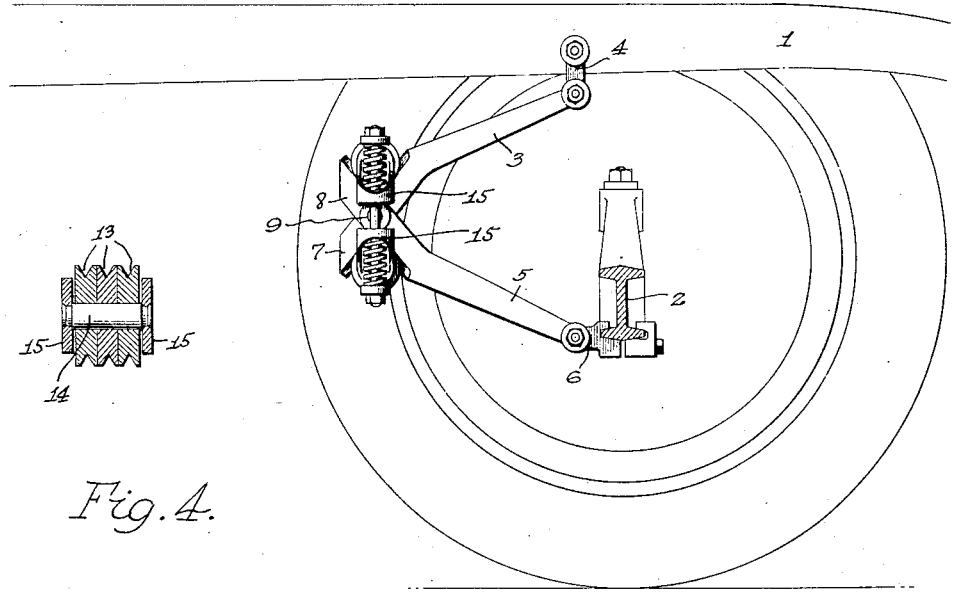
Fig. 4.
Fig. 1.
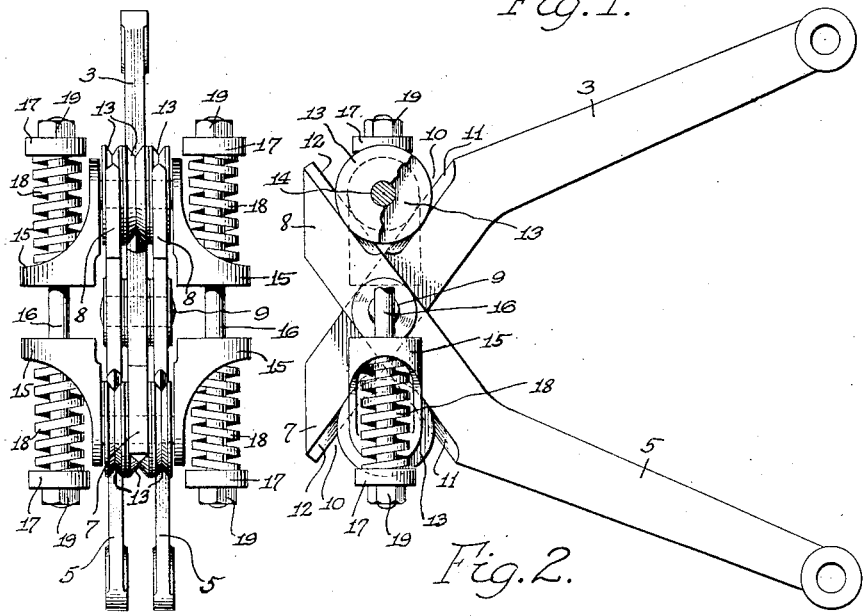
Fig. 3.
Fig. 2.
Inventor
Otto A. Krenke,
By
Attorneys Patented Apr. 17, 1928.

1,666,259

UNITED STATES PATENT OFFICE.

OTTO A. KRENKE, OF PORT HURON, MICHIGAN, ASSIGNOR OF ONE-HALF TO ERNEST L. POWERS, OF PORT HURON, MICHIGAN.

SHOCK ABSORBER.

Application filed February 7, 1927. Serial No. 166,416.

My invention aims to provide a shock absorbing device that may be advantageously used in connection with vehicles, between the vehicle body and the supporting axles thereof, to reduce the vibrations, jars and shocks incident to irregular road conditions encountered by the vehicle when traveling over such roads.

My invention further aims to provide a purely mechanical shock absorbing device in contradistinction to pneumatic and hydraulic devices, and my invention also differentiates from that class of auxiliary shock absorbing devices commonly termed "snubbers", wherein a spring actuated flexible take-up member articulates movable parts of a vehicle. In contradistinction to these well known types of shock absorbers, I have a leverage controlled compound equalizer and these equalizers may be installed at such points on a vehicle that the body will be prevented from rebounding to any excessive extent when shifted by a spring suspension brought into action to cushion the vehicle body relative to its supporting axles.

My invention still further aims to provide a simple and durable shock absorbing device consisting of inexpensive parts easy to install and maintained in an operatable condition. These and other advantages gained by my invention will be more apparent as the construction is described by aid of the drawing wherein Figure 1 is a side elevation of the shock absorbing device illustrating one manner of installing the same in connection with a vehicle;

Fig. 2 is an enlarged side elevation of the shock absorbing device partly broken away and partly in section;

Fig. 3 is an end view of the same, and

Fig. 4 is a cross sectional view of a multiple roller bearing forming part of the device.

My device is capable of general use and as an example of one of these uses, I show a portion of a vehicle frame, chassis or body 1 located above a wheel equipped axle 2 which may be subjected to vibrations incident to irregular road conditions. Ordinarily the vehicle body is supported relative to the axle 2 by a spring suspension (not shown). As a result of such body cushioning means the body is subjected to excessive rebounds and my device is interposed between the axle and the body to resist the rebound and by such retardation prevent the spring suspension and other parts of the vehicle from being subjected to excessive stresses and strains which often result in broken parts. Retarding the rebound affords greater comfort to the occupants of a pleasure vehicle body and safer loads for a commercial body.

Considering the construction of my device there are converging pivotally connected and crossed members, one in the form of a single lever 3 which has its inner end connected to the body 1 by a shackle 4 or the like, and the other member is in the form of two levers 5 pivotally supported from the axle 2 or some part thereof by a suitable bracket or mounting 6. The outer ends of the levers 3 and 5 terminate in angularly disposed arms 7 and 8 respectively with the arms 7 extending between the arms 8 and said arms pivotally connected by a transverse pin 9 or other pivotal means. The arms 7 and 8 are in crossed and somewhat intersecting relation so as to form V-ways 10, adapted to be distended or retracted by movement of the arms produced by the levers 3 and 5 moving to and from each other. Obviously the arms 8 may represent the bifurcated end of a single lever, but from a manufacturing standpoint an advantage is gained in using two of the levers 5 because of being structurally the same as the single lever 3.

Each of the arms 7 and 8 afford inner rails 11 and outer rails 12, preferably V-shaped in cross section. The inner rails 11 may be considered as apposing the outer rails 12 and cooperating therewith in forming the V-ways 10. On the rails 11 and 12 are peripherally grooved rollers or wheels 13 arranged side by side and rotatable on shafts or pins 14 connecting side compound equalizers solely supported from the arms 7 and 8 of the device.

Each compound equalizer is preferably in the form of opposed brackets 15 and extending through said brackets are tie rods 16 having spring retainers 17 for coiled springs 18 encircling the tie rods, between the brackets 15 and the retainers 17. The springs 18 are capable of compression by the brackets 15, at each side of the shock absorbing device shifting away from each other incident to retraction of the V ways 10 by compression of the levers 3 and 5. Such compression is incident to the body 1 rebounding relative to the axle 2 and when the body 1 and the axle 2 assume normal relation the expansive forces of the springs 18 restore the brackets 15 to normal position so that the compound equalizers cannot become accidentally displaced relative to the rails 11 and 12 of the arms 7 and 8.

The rollers or wheels 13 constitute antifrictional bearings for the side compound equalizers relative to the crossed supporting arms 7 and 8, which have a scissors-like action when distending the compound equalizers.

I attach considerable importance to the side compound equalizers being freely suspended or supported by the arms 7 and 8, and by virtue of nuts 19 or the like on the ends of the tie rods 16 the tension of the springs 18 may be regulated without necessarily removing the compound equalizers, also the parallel articulated arrangement of the equalizing devices with the leverage mechanism therebetween, because the pivot of the levers is constantly in the plane of the roller axes, thus permitting the shock absorber to occupy various positions other than in connection with vehicles parts. Then again, the scissor-like action of the levers causes an equal stress on the spring structures solely suspended or supported from said levers.

Easy access is had to the rails 11 and 12 for cleaning and lubricating purposes and it is the simplicity of construction that reduces the cost of manufacture and maintenance, besides permitting of the device being easily and quickly installed.

It is thought that the action of my shock absorbing device will be apparent without further description, and while in the drawing there is illustrated a preferred construction and installation, it is to be understood that the structural elements are susceptible to such variations as fall within the scope of the appended claims.

What I claim is:—

1. A shock absorber comprising pivotally connected members affording V-ways, anti-frictional bearings in said V-ways, and compound equalizers supported from said bearings and adapted to resist retraction of said V-ways by a pivotal movement of said members.

2. A shock absorber as called for in claim 1, wherein said members are in the form of levers having crossed arms forming said ways.

3. A shock absorber as called for in claim 1, wherein said bearings are in the form of rollers adapted to travel on end edges of said members.

4. A shock absorber as called for in claim 1, wherein said compound equalizers are arranged at the sides of said members with each equalizer including opposed spring retaining brackets.

5. A shock absorber comprising crossed members pivotally connected to provide ways adapted to be distended and retracted by pivotal movement of said members, and means supported from within said member ways adapted to resist contraction of said ways.

6. A shock absorber comprising crossed members pivotally connected to provide ways adapted to be distended and retracted by pivotal movement of said members, supporting means movable in the ways, and retractible means articulating said supporting means and adapted to resist shifting of said supporting means by said members.

7. A shock absorber for a vehicle, said shock absorber comprising pivoted levers adapted to connect movable vehicle parts, said levers having rail ends, rollers on the rail ends of said levers, and means articulating said rollers and resisting movement of said rollers by the rail ends of said levers.

8. A shock absorber comprising compound equalizing devices disposed in parallelism, bearings supported between said equalizing devices, and levers extending between said bearings and having a scissor-like action between and against said bearings to separate said bearings against the action of said equalizing devices.

9. A shock absorber comprising yieldably connected rollers movable to and from each other, and pivotally connected levers interposed between said rollers with the pivot of said levers constantly in a plane connecting the axes of said rollers and said levers adapted for separating said rollers.

In testimony whereof I affix my signature.

OTTO A. KRENKE.